United States Patent [19]
Brooks, Sr.

[11] Patent Number: 5,246,091
[45] Date of Patent: Sep. 21, 1993

[54] DRUM BRAKE WHEEL CYLINDER WITH INTERNAL ADJUSTER

[75] Inventor: Frank W. Brooks, Sr., Dayton, Ohio

[73] Assignee: General Motors Corporation, Detroit, Mich.

[21] Appl. No.: 891,081

[22] Filed: Jun. 1, 1992

[51] Int. Cl.$^5$ .............................................. F16D 51/52
[52] U.S. Cl. ................... 188/196 D; 188/79.62
[58] Field of Search ............... 188/71.9, 79.51, 79.54, 188/79.56, 196 A, 196 C, 196 D, 196 R, 196 P, 196 V, 364, 79.62

[56] References Cited

U.S. PATENT DOCUMENTS

| | | | |
|---|---|---|---|
| 4,056,173 | 11/1977 | Farr | 188/71.9 |
| 4,386,685 | 6/1983 | Cole et al. | 188/196 V X |
| 4,742,897 | 5/1988 | Hiroshi et al. | 188/79.51 X |
| 4,792,021 | 12/1988 | Fukuzawa et al. | 188/196 A X |

FOREIGN PATENT DOCUMENTS 2217799  11/1989  United Kingdom ............... 188/71.9

Primary Examiner—Robert J. Oberleitner
Assistant Examiner—Kevin D. Rutherford
Attorney, Agent, or Firm—Ernest E. Helms

[57] ABSTRACT

A wheel cylinder has a body, pistons, boots and seals. A screw assembly positioned between the two pistons holds the pistons apart to maintain the specified clearance between the brake linings and the brake drum while the brake is released. If a predetermined amount of outward movement of the pistons occurs during brake actuation, the screw rotates with further piston outward movement. When the brake is released, the pistons return inwardly, and the screw is locked against reverse rotation by means of a clutch, preventing the pistons from returning more than the prior predetermined amount of outward movement before screw rotation began. A clutch seal on an extension of one clutch member seals in a piston cylinder section. The other clutch member is formed on that piston next to one end of the cylinder section. The cylinder section axially beyond the seal is vented to atmosphere. A cross pin extends across a cavity in the one clutch member, is mounted in slots formed in the one clutch member and in the screw, and permits limited movements of the pin axially of the wheel cylinder. The space between the closed sides of the one clutch member slots, combined in series with the space between the closed slides of the screw slot, define the allowable amount of axial movement between the two pistons without disengaging the adjuster clutch under excessively high pressure conditions. This allowable amount of axial movement is greater than that occurring in any one cycle of the brake.

4 Claims, 1 Drawing Sheet

DRUM BRAKE WHEEL CYLINDER WITH INTERNAL ADJUSTER

FIELD OF THE INVENTION

The invention relates to a wheel cylinder for a drum brake in which an internal adjuster is provided to maintain adjustment of the brake shoes in relation to the brake drum as the shoes wear. The adjuster includes a pressure sensing arrangement which prevents overadjustment due to extremely high line pressures or weak brake drums.

BACKGROUND OF THE INVENTION

The conventional drum brake adjusting mechanism is a screw thread or ratchet arrangement which is positioned in the brake drum between the brake shoes. It may be in a strut near the wheel cylinder, which is also used to operate the parking brake, or it may be between the ends of the shoes opposite the shoe ends acted on by the wheel cylinder. It is exposed to brake lining and road dust as well as to water, dirt, oil and other contaminants. This is particularly the case when the brake is on an automotive vehicle. Some adjusters have been previously built into the drum brake wheel cylinder, submerging the mechanism in brake fluid and sealing it in the brake hydraulic system. Prior drum brake adjusters located within wheel cylinders have been of the incrementally adjusting type. They are prone to overadjustment under excess brake actuating pressure.

SUMMARY OF THE INVENTION

The basic wheel cylinder embodying the invention has a functionally conventional wheel cylinder body, pistons, boots and seals. Instead of using the conventional lip cup pressurizing seals, however, O-rings are used. A screw member is positioned between the two pistons and holds the pistons apart to maintain the specified clearance between the brake linings and the brake drum while the brake is released. It also functions as a strut between the primary and secondary brake shoes. After a predetermined amount of outward movement of the pistons during brake actuation, the screw rotates with further piston outward movement. When the brake is released, the pistons return inwardly, and the screw is locked against reverse rotation by means of a clutch, preventing the pistons from returning more than the prior predetermined amount of outward movement before screw rotation began. The predetermined amount of such outward movement and limit of return movement establish the clearance between the brake linings and the friction surface of the brake drum in the brake released condition, and that is a constant clearance rather than an incremental clearance between a minimum and a maximum clearance.

The arrangement for preventing overadjustment of the brake shoes due to very high brake actuating pressures or weak brake drums includes a clutch seal and compression spring. The seal is on an extension of one clutch member and seals in a cylinder section of one of the pistons. The other clutch member is formed on that piston next to one end of the cylinder section. The cylinder section axially beyond the clutch members is vented to atmosphere through an opening protected by the wheel cylinder boot on one end of the wheel cylinder. A cross pin extends across a cavity in the one clutch member and is mounted in slots formed in the one clutch member and permitting limited movements of the pin axially of the wheel cylinder. The cross pin also is mounted in a slot formed in one end of the screw so that the screw and the one clutch member cannot rotate relative to each other. A spring cavity is located in the one end of the screw and opens into the slot formed in that screw one end through one closed side of the screw end slot. A compression spring is received in the spring cavity with one spring end seated at the base of the cavity and the other spring end seated on the cross pin so as to continually urge the cross pin toward engagement with the screw at the other closed side of the screw end slot opposite the spring cavity. In normal operating conditions, the cross pin is in engagement with that other closed side of the screw end slot.

When hydraulic actuating pressure in the wheel cylinder reaches a predetermined pressure which is sufficiently high to keep the clutch engaged, the screw is unable to rotate. The hydraulic pressure will then cause the screw, and therefore the slot in the screw end, to be moved axially relative to the one clutch member without any screw rotation. The pin will be forced to follow the screw slot base, with the pin ends sliding in the slots in the one clutch member. If sufficient piston actuating movement occurs, the pin end will engage the ends of the slots in the one clutch member while the screw moves further axially. During this phase of operation, the screw slot other closed end will then be moved axially away from the pin. So long as the clutch remains engaged by the hydraulic pressure, however, the screw is not rotated, and no adjustment occurs.

The space between the closed sides of the one clutch member slots, combined in series with the space between the closed slides of the screw slot, define the allowable amount of axial movement between the two pistons without disengaging the adjuster clutch under this condition. This allowable amount of axial movement is greater than that which will occur in any one actuation and release cycle of the brake. Adjustment action, therefore, only occurs during a brake actuating and release cycle while the hydraulic brake actuating pressure is not so high as to maintain the clutch members in engagement. Adjustment action will not occur so long as the predetermined high pressure is being exceeded by the brake actuating pressure in the wheel cylinder.

DETAILED DESCRIPTION OF THE PREFERRED EMBODIMENT

Figure 1:
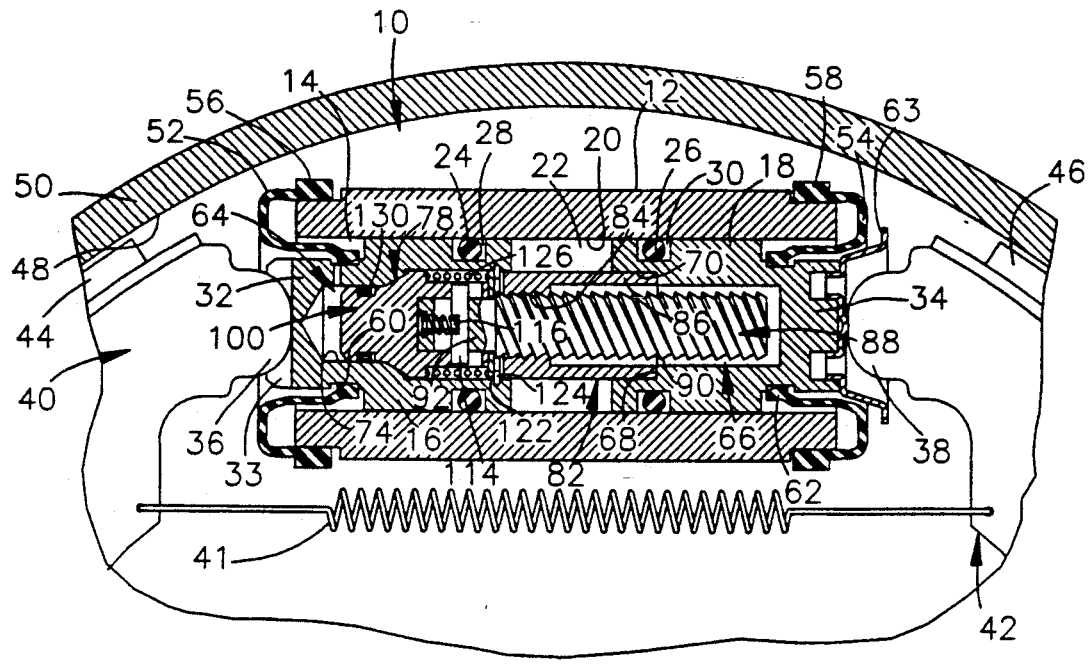
FIG. 1 is a cross section view with parts broken away of a drum brake wheel cylinder embodying the invention.
Figure 2:
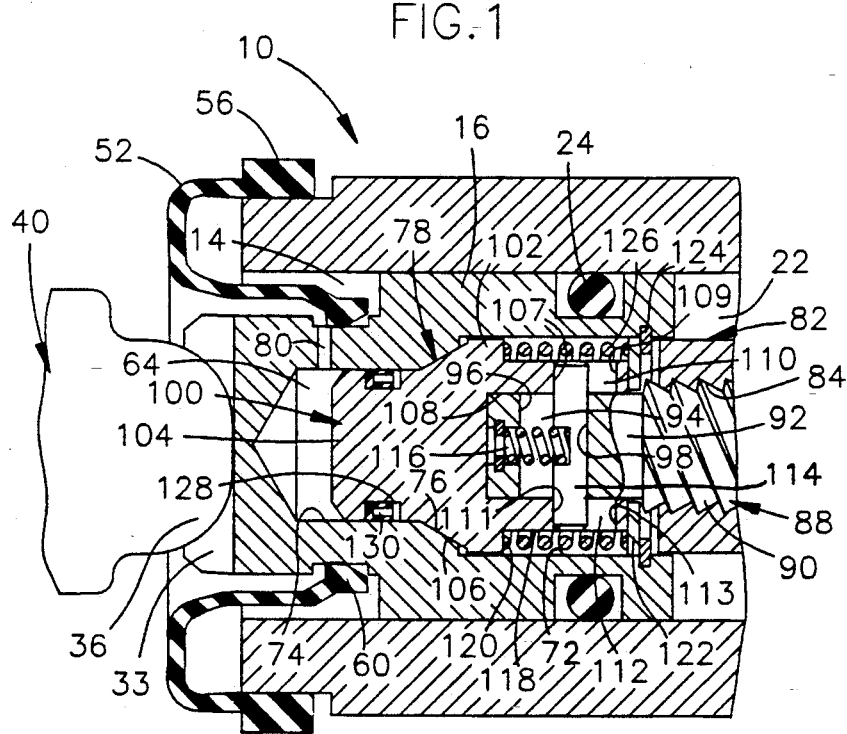
FIG. 2 is an enlarged fragmentary cross section view with parts broken away of the left side of the drum brake wheel cylinder of FIG. 1.

The wheel cylinder assembly 10 includes a body 12 having a bore 14 formed axially therethrough. Oppositely disposed pistons 16 and 18 are reciprocally received in bore 14 and cooperate with the wall 20 of the bore to define the wheel cylinder pressurizing chamber 22. Pistons 16 and 18 are respectively provided with O-ring seals 24 and 26 located in grooves 28 and 30 so that the seals engage the bore wall 20 in slidable sealing relation. Pistons 16 and 18 also respectively have reduced diameter outer ends 32 and 34 which are normally engaged by the adjacent ends 36 and 38 of the primary brake shoe 40 and the secondary brake shoe 42. Piston outer end 32 has an open slot 33 formed therein in which the primary brake shoe end 36 is received. This prevents rotation of piston 16 in the wheel cylinder body bore 14.

The shoes 40 and 42 respectively have brake linings 44 and 46 secured thereto for friction braking engagement with the braking surface 48 of brake drum 50 when the brake assembly is actuated. The shoes are retracted by retraction spring 41, with the spring retraction force being exerted through the shoes to also move pistons 16 and 18 to their retracted positions shown in the drawing.

Wheel cylinder boots 52 and 54 are respectively secured to the opposite ends of the wheel cylinder body at their outer peripheries 56 and 58 and to the reduced diameter ends 32 and 34 of pistons 16 and 18 at their inner peripheries 60 and 62. The star wheel manual adjustment plate 63 is shown as being press fitted into and over parts of the reduced outer end 34 of piston 18. Plate 63 typically has teeth formed on its outer diameter to accommodate a manual brake adjusting tool by which piston 18 and therefore nut 82 is rotated relative to screw 88, providing the proper initial adjustment position of the assembly. Plate 63 may be integral with piston 18 in some applications.

Piston 16 has a stepped recess bore 64 formed in it, and piston 18 has a generally similar stepped recess bore 66 formed in it. Both recess bores are open to the pressurizing chamber 22. Recess bore 66 has a shoulder 68 near its open end so that the larger diameter section 70 of the bore is in the recess end opening into chamber 22. Recess bore 64 has its larger diameter section 72 at the recess end opening into chamber 22 and a smaller diameter section 74 extending into part of the piston reduced diameter outer end 32. Recess bore sections 72 and 74 are separated by a conically shaped shoulder 76 which forms one clutch member of the adjuster clutch 78. The closed end of bore section 74 is vented through passage 80 to atmosphere, with the outer opening of passage 80 being protected against contaminants by the boot inner periphery 60.

A nut 82 having a high-lead internal thread section 84 at one end has its other end 86 press fitted into the recess bore section 70 of piston 18, with the nut engaging shoulder 68. A screw 88 having high-lead external threads 90 is threaded through nut 82. The threads 84 and 90 lock with compression axial forces exerted on them so that they do not back down when they are loaded with such forces. Screw 88 extends into recess 66 and has a reduced diameter end 92 without threads thereon extending into recess 64. Screw end 92 has a transverse slot 94 formed therethrough. Slot 94 has closed sides 96 and 98 so that it opens only transversely outward.

Adjuster clutch 78 has another clutch member 100. Member 100 has an enlarged inner end 102 and a reduced diameter outer end 104 separated by a conically shaped shoulder 106 which mates with shoulder 76 to form cone clutch 78. A recess 108 is formed in the enlarged inner end 102 of clutch member 100 and opens toward chamber 22. Axially extending radially opposed closed-side slots 110 and 112 are formed through the enlarged inner end 102 and are aligned with closed-slide slot 94 of screw end 92. Slot 110 has closed sides 107 and 109 spaced apart axially of the wheel cylinder body, and slot 112 has closed sides 111 and 113 also spaced apart axially of the wheel cylinder body. Slot sides 107 and 111 are aligned, as are slot sides 109 and 113. A cross pin 114 is slidably received in slots 94, 110 and 112. A compression spring 116 is received in a spring recess formed in the closed side 96 of screw slot 94 and engages pin 114 so that the pin is urged toward chamber 22 by spring 116 and normally engages the closed side 98 of screw slot 94. The ends of cross pin 114 are received in slots 110 and 112 so that they can engage either slot sides 107 and 111 or slot sides 109 and 113.

The outer periphery of inner end 102 of clutch member 100 has a reduced diameter section 118 terminating at a shoulder 120 which defines a spring seat. Another spring seat 122 is an annular member received in annularly spaced relation about the reduced diameter end 92 of screw 88. A spring clip 124, received in an internal groove at the inner end of piston 16, retains spring seat 122 against axial movement out of bore section 72. Clutch compression spring 126 engages spring seats 120 and 122 and continually urges the clutch member conical shoulder 106 toward engagement with the clutch member conical shoulder 76.

The reduced diameter outer end 104 of clutch member 100 has an external groove 128 in which V-block seal 130 is received. Seal 130 is exposed to the hydraulic fluid pressure exerted in chamber 22 during brake hydraulic pressure actuation as that pressure is transmitted past the enlarged inner end 102 and the conical shoulder 106 of clutch member 100. At times it may be best to provide small grooves in the surfaces of end 102 between the shoulder 106 and the shoulder 120, and also in the surface of shoulder 106 or shoulder 76 to assure the presence of the hydraulic pressure on the pressure side of seal 130. Such grooves for fluid passage through a cone clutch are well known in the art. Seal 130 is so arranged that it seals against fluid loss from chamber 22 when any hydraulic fluid pressure in chamber 22 is being exerted against it.

GENERAL DESCRIPTION OF OPERATION

The adjuster includes a normally engaged cone clutch 78 which is disengaged by predetermined excessive movement of the wheel cylinder pistons 16 and 18 during pressure actuation, permitting relative rotation of threaded members 82 and 88 until the cone clutch is again engaged. A lesser amount of permissible return movement of the pistons upon pressure release of the wheel cylinder pistons is determined by the amount of such relative rotation, if any, that occurs. The pistons 16 and 18 are thus prevented from further inward movement in response to retraction of the brake shoes 40 and 42, with the brake shoes consequently being positioned to remain at a substantially constant distance from the brake drum friction braking surface 48 each time that the brake returns to the released condition. A pressure sensing feature prevents overadjustment of the brake which might otherwise occur due to extremely high line pressures or weak brake drums.

DETAILED DESCRIPTION OF OPERATION

The wheel cylinder assembly 10 is illustrated in the drawing with the brake of which it is a part being in the released condition so that the linings 44 and 46 are slightly spaced from the drum friction braking surface 48. The retraction spring 41, acting on shoes 40 and 42, has positioned pistons 16 and 18 in the positions shown in the drawing. The clutch 78 has its clutch surfaces 76 and 106 in engagement. The closed sides 107 and 111 of the slots 110 and 112 are in engagement with the ends of cross pin 114. The cross pin is also in engagement with the closed side 98 of slot 94 formed in the end 92 of screw 88. Nut 82 and screw 88 are prevented from threading action tending to shorten their combined effective length since screw 88 is prevented from rotating relative to piston 16 and the screw and nut threads are locking threads which do not back up under an axial compression load exerted on the screw and nut through their threads. These cross pin and clutch engagements and the locking action of the threads cooperate to establish the precise axial distance between pistons 16 and 18 and therefore the precise location of the brake shoe linings in relation to the drum friction braking surface 48.

When the brake is actuated, hydraulic brake actuating pressure is exerted in chamber 22 in a manner well known in the art. This pressure acts on pistons 16 and 18 to move them axially in opposite directions in bore 14. It also acts on seal 130 so that fluid is prevented from flowing past that seal to vent 80 and out of the wheel cylinder. It also acts on clutch member 100 across the effective area of reduced diameter outer end 104 to urge the clutch surface 106 into continued engagement with the clutch surface 76. So long as a predetermined actuating pressure in chamber 22 is not exceeded, however, the action of the pressure across the effective area of reduced diameter outer end 104 is insufficient to prevent the clutch 78 from disengaging as pistons 16 and 18 move apart after taking up the adjustment clearance. This disengagement of the clutch occurs after movement of piston 18, with nut 82, screw 88 and cross pin 114, relatively away from piston 16 and clutch member 100 to the extent that the ends of cross pin 114 have engaged the closed sides 109 and 113 of slots 110 and 112. Compression spring 116 continues to hold pin 114 against slot closed side 98 as piston 18 acts through nut 82, screw 88 and pin 114 to initially move that pin rightwardly as seen in the drawing until its ends engage the right sides 109 and 113 of the closed-side slots 110 and 112.

The predetermined permissible amount of movement of pin 114 in slots 110 and 112 until the pin ends engage the closed sides 109 and 113 of those slots determines the amount of actuation of the wheel cylinder that may occur without any adjustment of the shoes. This amount of actuation is preferably just sufficient to take up the clearance between the friction surfaces of the linings and the brake drum and any slight compression of the linings. With further rightward movement of the piston 18 and nut 82, screw 88 and pin 114 then move clutch member 100 rightwardly relative to piston 16, disengaging the clutch surfaces 76 and 106 while compression spring 126 is compressed. In the released position shown, with the clutch surfaces 76 and 106 engaged, there is slight axial clearance between the end of clutch member 100 and the annular spring seat 122. This permits sufficient movement of the clutch member 100 to disengage the clutch 78. So long as the clutch 78 was engaged, clutch member 100 and screw 88 could not rotate separately relative to nut 82, and no adjusting action could take place. However, when clutch 78 is disengaged, the force of compression spring 126 urges clutch member 100 axially leftward as seen in the drawing to re-engage the clutch. This urging results in leftward movement which rotationally and axially moves screw 88 with clutch member 100 and the clutch member 100. Screw 88 rotates relative to nut 82 by action of the high-lead threads of the nut and the screw until the engagement of the clutch is re-established. This extends the effective length of the combined nut 82 and screw 88 by the distance needed to adjust the brake shoes, so that when the brake pressure in chamber 22 is released, the pistons 16 and 18 return to a position which is slightly further apart axially than before the actuation and release cycle, preventing the brake shoes from retracting quite so far as they did on the previous actuation and release cycle and maintaining the brake linings at the desired predetermined distance from the drum friction braking surface 48 while the brake is released.

Occasionally, however, such as in panic braking when the brake is fully applied by a near maximum brake actuating pressure, the pistons 16 and 18 may be forced outwardly further than the stroke normally required to actuate the brake. This can be due to distortion of parts of the brake assembly as unusually high brake actuating forces are generated. For example, the brake drum 50 may be slightly elongated rather than remaining precisely round during brake actuation due to the extremely high oppositely exerted brake forces, generated by such extremely high actuating pressure, acting on it through the oppositely disposed brake shoes 40 and 42. This more easily occurs when the brake drum has been turned or reworked to smooth out the friction braking surface 48 until the drum is too thin and its resistance to such elongation is weakened. It may also occur when the pressure build-up in chamber 22 occurs at a very fast rate, causing some distortion of the brake shoes and other shoe linkage as they try to accommodate the changed forces exerted on them. In either instance, this would result in over-adjustment of the brake shoes. The provision of the V-block seal 130 and its exposure to the high pressure in chamber 22 effectively prevents this over-adjustment.

Once a predetermined pressure in chamber 22 is reached, and as above noted acts across the effective area of the reduced diameter outer end 104 of the clutch member 100 (the other side of that effective area being at atmospheric pressure via vent passage 80), clutch 78 is maintained engaged to prevent any relative rotation of screw 88 in nut 82 and therefore preventing any adjusting action occurring while that predetermined pressure (or a still higher pressure) is maintained. Movement of screw 88 with further movement of nut 82 and piston 18 relative to piston 16 and clutch member 100 acts to compress spring 116 so that the screw is moved rightwardly as seen in the drawing but the clutch member 100 is not so moved. The pin 114 then becomes disengaged from slot closed side 98 and is approached by slot closed side 96. Adjustment can then only occur upon brake release after the pressure in chamber 22 is decreased below the predetermined pressure and the clutch is released as above described, allowing the screw 88 to rotate relative to nut 82 and increase the effective length of the screw and nut only to the extent that any adjustment would have occurred if the predetermined pressure had not been attained or exceeded.

The embodiments of the invention in which an exclusive property or privilege is claimed are defined as follows:

1. In a drum brake wheel cylinder assembly having a wheel cylinder body with a cylinder bore therethrough, first and second pistons in said bore defining therewith a brake actuating pressure chamber which when pressurized urges said pistons in opposite directions to actuate the brake shoes of a drum brake, adjusting means in said wheel cylinder bore connecting said pistons and acting to adjust the released positions of said pistons in said bore in accordance with the relative movement of said pistons during brake actuation beyond a predetermined amount, the improvement comprising:

said adjusting means having a high-lead locking thread screw and a high-lead locking thread nut threaded together and a normally engaged adjuster clutch connecting said pistons;

said clutch when engaged preventing said screw and nut from relative rotational movement and when disengaged permitting said screw to rotate relative to said nut and increase the effective length of said screw and nut to provide said adjustment;

means for causing said clutch to become disengaged after a predetermined amount of relative movement of said pistons in the brake actuating direction;

and means responsive to the actuating pressure in said chamber above a predetermined pressure value maintaining said clutch engaged even though said predetermined amount of relative movement of said pistons in the brake actuating direction has been exceeded while said predetermined pressure value is also exceeded, said actuating pressure responsive means including one member of said clutch and wherein said first piston having means preventing rotation thereof in said wheel cylinder body bore and an axially extending recess formed therein opening into said pressure chamber;

said adjuster clutch having a first clutch member formed on said first piston in said first piston axially extending recess and a second clutch member received in said first piston axially extending recess for selective reciprocal and rotational movement and engagement with said first clutch member, said clutch members when engaged preventing rotational movement of said second clutch member relative to said first piston;

said high-lead locking thread screw having means securing one screw end to said second clutch member against relative rotation while permitting limited axial relative movement between said screw and said second clutch member by a pin passing through a slot in said screw end;

first spring means continually urging said screw axially away from said first clutch member and second spring means continually urging said second clutch member toward engagement with said first clutch member;

and said high-lead locking thread nut being secured to said second piston for axial and rotatable movement therewith.

2. In the drum brake wheel cylinder assembly of claim 1, said means responsive to the actuating pressure said chamber above a predetermined pressure value maintaining said clutch engaged including:

said first piston axially extending recess having a closed end vented to atmosphere;

a seal on said second clutch member engaging the wall of said first piston recess in axially reciprocal sealing relation so as to seal said pressure chamber against pressure leakage from said pressure chamber past said second clutch member into said first piston axially extending recess closed end, said seal and said second clutch member cooperatively defining a pressure responsive area subject to actuating pressure in said pressure chamber urging said clutch into engagement and at and above said predetermined pressure value maintaining said clutch engaged.

3. A drum brake adjuster in a wheel cylinder assembly having a wheel cylinder body with a bore extending axially therethrough, first and second pistons reciprocally received in said bore and defining with said bore a brake actuating pressure chamber, said pistons being adapted when brake actuating pressure is introduced into said chamber to move in axially opposite directions to move drum brake shoes into friction braking engagement with a brake drum, said first piston having means preventing its rotation in said bore and said second piston being permitted to rotate in said bore, said drum brake adjuster comprising:

a screw having a high-lead locking threaded end and an unthreaded end, said screw being operatively threaded into said second piston for axial movement with said second piston under certain conditions and for combined axial and rotational movements relative to said second piston under certain other conditions;

a close-sided cross slot formed in said unthreaded end of said screw, a cross pin in said cross slot having ends extending transversely beyond said screw, and a compression spring mounted in said screw and engaging said cross pin so as to continually urge said pin toward said screw threaded end and into engagement with one side of said close-sided cross slot;

said first piston having an axially extending stepped recess formed therein opening into said brake actuating pressure chamber at its larger end, and an adjuster clutch in said recess, said recess larger and smaller ends being separated by a conical shoulder forming a first engagement surface of said clutch;

an axially stepped clutch member received in said first piston recess for axial and rotational movements relative to said first piston, said clutch member having a larger diameter section received in said first piston recess larger end and a smaller diameter section received in said first piston recess smaller end, said clutch member having a second clutch engagement surface of said clutch formed as a conical shoulder thereon joining said larger and smaller diameter sections thereof and normally in clutch mating engagement with said first clutch engagement surface to prevent rotation of said clutch member relative to said first piston, a clutch compression spring received in said first piston larger end and having one end acting on said clutch member and its other end operatively acting on said first piston to continually urge said clutch member second clutch engagement surface into engagement with said first piston first clutch engagement surface, said clutch member larger diameter section having a recess formed therein opening into said brake pressure actuating chamber and transversely aligned close-sided cross slots formed therein with their inner ends opening into said clutch member recess;

said screw non-threaded end and said cross pin being received in said clutch member larger diameter section recess with said cross pin ends extending into said clutch member cross slots and permitting limited axial movements of said screw and said cross pin relative to said clutch member but preventing rotational movement of said screw and said cross pin relative to said clutch member;

and means continually urging said pistons to their retracted released positions and in so doing urging said cross pin ends into engagement with the closed sides of said clutch member slots nearer said clutch member reduced diameter section, the engagement of said clutch member engagement surfaces and said cross pin with said slot closed sides as aforesaid and the locking thread action of said screw threads cooperating to define the effective length of said drum brake adjuster during brake release and establish a desired adjustment of the drum brake shoes in relation to the brake drum while the brake is released;

during normal brake actuation by pressure in said pressure chamber, said pistons being moved in opposite axial directions and said cross pin moving in said clutch member slots and engaging said cross pin ends with the other closed sides of said clutch member slots when all permissible normal brake-actuating movements have occurred without requiring adjustment by said adjuster, with any further brake actuating movements of said pistons causing said screw and said cross pin to exert axial force on said clutch member to move said clutch member axially to disengage said clutch surfaces, said clutch member under the influence of said clutch compression spring then being permitted to rotate said screw through said cross pin and said high-lead thread of said screw, threading said screw further out of said first piston and increasing the effective length of the adjuster, allowing said clutch to again be engaged with the adjuster at its adjusted effective length.

4. The drum brake adjuster of claim 3, said first piston recess smaller end being vented to atmosphere;

said clutch member further having a seal sealing said smaller diameter section and said first piston recess smaller end against pressure leakage from said brake pressure actuating chamber to atmosphere past said clutch member when brake actuating pressure is present in said chamber;

brake actuating pressure beyond a predetermined value acting in said pressure chamber also acting on said clutch member across the effective area of said clutch member smaller end section and holding said clutch in engagement irrespective of additional movements of said pistons in their brake actuation directions, such additional movements being accommodated by said closed end slot in said screw non-threaded end and said compression spring action on said cross pin, said compression spring yielding with additional expanding movement of said pistons and allowing said cross pin to hold its axial position in relation to said clutch member while said screw moves axially, said screw closed-side slot moving axially of said wheel cylinder relative to said cross pin, preventing any disengagement of said clutch and therefore preventing any excess adjustment of said adjuster because of brake actuating pressures in excess of said predetermined pressure.

* * * * *